United States Patent [19]
Sugiyama et al.

[11] Patent Number: 5,478,895
[45] Date of Patent: Dec. 26, 1995

[54] POLYOXYMETHYLENE COMPOSITION AND MOLDED ARTICLE THEREOF

[75] Inventors: Noriyuki Sugiyama, Shizuoka; Hiroko Iizuka, Fuji, both of Japan

[73] Assignee: Polyplastics Co., Ltd., Japan

[21] Appl. No.: 292,804

[22] Filed: Aug. 10, 1994

[30] Foreign Application Priority Data

Aug. 24, 1993 [JP] Japan ................... 5-209215

[51] Int. Cl.$^6$ ................ C08L 71/02; C08L 61/28
[52] U.S. Cl. ................ 525/398; 525/157; 525/515; 524/424; 524/433
[58] Field of Search ................ 525/398, 515, 525/157; 524/433, 424

[56] References Cited

U.S. PATENT DOCUMENTS

| | | | |
|---|---|---|---|
| 4,139,575 | 2/1979 | Amann et al. | 260/849 |
| 4,652,594 | 3/1987 | Auerbach et al. | 523/208 |

FOREIGN PATENT DOCUMENTS 0363752  4/1990  European Pat. Off. .
2540207  11/1976  Germany .

OTHER PUBLICATIONS

Abstract of Japanese 93-232514.

Abstract of Japanese 82-64818E.

*Primary Examiner*—W. Robinson Clark
*Attorney, Agent, or Firm*—Nixon & Vanderhye

[57] ABSTRACT

Polyoxymethylene compositions exhibiting improved heat stability and reduced formation of mold depositions during molding are usefully employed to form molded articles used as parts for electrical or electronic equipment since such parts experience few malfunctions due to formic acid generated from the composition. The preferred composition includes a blend of 100 parts by weight of polyoxymethylene resin with (a) 0.01 to 5.0 parts by weight of an antioxidant, (b) 0.01 to 5.0 parts by weight of a melamine-formaldehyde polycondensate, and (c) 0.001 to 10 parts by weight of at least one metallic compound selected from magnesium oxide, magnesium carbonate, and calcium oxide.

6 Claims, No Drawings

POLYOXYMETHYLENE COMPOSITION AND MOLDED ARTICLE THEREOF

FIELD OF INVENTION

The present invention relates to a polyoxymethylene composition which exhibits heat stability, and particularly reduced amounts of mold deposit during molding. The composition is useful for the production of electrical or electronic equipment parts to provide electrical or electronic equipment which avoids malfunctions due to formic acid generated from the composition (including malfunctions attributable to staining by virtue of substances bleeding from rubber parts and corrosion of magnetic metal members). The present invention also relates to molded articles of the polyoxymethylene composition.

BACKGROUND AND SUMMARY OF THE INVENTION

Polyoxymethylene (POM) is a homopolymer or copolymer prepared from formaldehyde, (a cyclic trimer of formaldehyde), or trioxane in combination with a comonomer such as a cyclic ether or a cyclic formal. POM has stabilized molecular terminals, and is blended with additives such as antioxidants or any other heat stabilizer in order to prevent is decomposition thereof.

A melamine-formaldehyde polycondensate is known as a useful additive, among others. The use of a combination of an antioxidant and a water-soluble melamine-formaldehyde polycondensate and the use of an antioxidant and a water-insoluble melamine-formaldehyde polycondensate are respectively proposed in German Patent Laid-Open No. 1694097 and Japanese Patent Laid-Open No. 33943/1977. These combinations improve the heat stability of the polyoxymethylene. However, further improvement is increasingly demanded in material properties, depending on the field in which the polyoxymethylene is utilized.

For example, reduction in malfunctions of mechanical parts for use in electrical or electronic equipment such as audio and video systems, has been demanded.

Illustratively, audio or video mechanical parts manufactured and assembled in a highly clean environment (such as a dust-free room) for the purpose of avoiding environmental contamination, are likely to suffer problems during practical operation when exposed to a high-temperature and high-humidity atmosphere, even though there is no environmental contamination attributed to dust, or the like This problem is due to additives contained in a rubber roller employed as a member of the audio or video mechanical part which bleed to the rubber surface and contaminate the magnetic head through the magnetic tape. The rubber surface disposed in the audio or video mechanical part thus exposed to a high-temperature and high-humidity atmosphere is cleaned as a temporary countermeasure against the above problem. This cleaning is effective to some extent. However, the countermeasure is not only never permanent but also consumes immense labor. Further, the use of a molded polyoxymethylene article together with a magnetic metal member, such as a magneto-optical disk or a metallized tape, in a relatively closed state may cause the latter to corrode. Therefore, a radical solution to the problem has been desired in the art.

The present applicants have found that the problems noted above are strongly connected with the quality of the materials comprising audio or video mechanical parts. That is, it has been found that conventional molded polyoxymethylene articles (which have mainly been utilized as mechanical parts such as chassis, gears and bearings tape cassette parts such as reels and guide rollers and as disk cartridge parts such as shutters and cartridge frames) cause bleeding of rubber parts (such as rollers and belts) and corrosion of magnetic metal members in an atmosphere in which the temperature and humidity are relatively high. The reason for such problems is that formic acid contained in the molded polyoxymethylene article is released into moisture of highly humid atmosphere and adheres to and penetrates into the rubber and magnetic metal members. In particular, it has become apparent that, in the case of the rubber, the formic acid reacts with the magnesium oxide present in the rubber, which is sparingly soluble in water, to thereby form magnesium formate readily soluble in water, which bleeds to the surface of the rubber and contaminates the magnetic head through the tape. Further, it has become apparent that, in the case of magnetic metal members, the formic acid itself corrodes the metal.

As mentioned above, polyoxymethylene has its heat stability improved by the addition of an antioxidant and various stabilizers. However, the occurrence of some thermal decomposition during molding cannot be avoided, so that formaldehyde and formic acid as polyoxymethylene decomposition products are contained inside the molded article. The formaldehyde is gasified and released into the environment when the molded article is heated to several tens of degrees centigrade or above, so that the amount thereof can be extremely reduced by heating the molded article at high temperatures or degassing it in a vacuum. However, the amount of formic acid cannot be significantly reduced even if it is heated at temperatures as high as one hundred and several tens of degrees centigrade or treated in hot water.

The present application have found that, not only can the amount of generated formic acid be extremely reduced, but also the heat stability of polyoxymethylene can be improved by blending a specified metallic compound with a polyacetal resin containing an antioxidant and a melamine-formaldehyde polycondensate. The present invention has been completed on the basis of the above finding.

According to the present invention, there is provided a polyoxymethylene composition prepared by blending 100 parts by weight of a polyoxymethylene with (a) 0.01 to 5.0 parts by weight of an antioxidant, (b) 0.01 to 5.0 parts by weight of a melamine-formaldehyde polycondensate and (c) 0.001 to 10 parts by weight of at least one metallic compound selected from among oxides and carbonates of magnesium and calcium. Further, there is provided a molded polyoxymethylene article produced by molding the above composition, characterized in that the amount of formic acid generated from the molded article is 1.0 µg or below per square centimeter of the surface area thereof.

DETAILED DESCRIPTION OF THE PREFERRED EMBODIMENTS

The polyoxymethylene suitable for use in the present invention is a polymer whose main constituent unit is an oxymethylene group (—$CH_2O$—), and may be a polyoxymethylene homopolymer or any of a copolymer, a terpolymer and a block copolymer each containing a small amount of another constituent unit in addition to the oxymethylene group. The molecule thereof is not necessarily linear, and may have a branched or crosslinked structure. There is also no particular limitation with respect to the degree of polymerization or the like.

The antioxidant (a) suitable for use in the present invention may be, for example, a hindered phenol antioxidant, such as 2,2'-methylenebis(4-methyl- 6-t-butylphenol), 1,6-hexanediol bis[3-(3,5-di-t-butyl- 4-hydroxyphenyl)propionate], pentaerythritol tetrakis[3-(3,5-di-t-butyl-4-hydroxyphenyl)propionate], triethylene glycol bis[3-(3-t-butyl-5- methyl- 4-hydroxyphenyl)propionate], 1,3,5-trimethyl-2,4, 6-tris(3,5-di-t-butyl-4-hydroxybenzyl)benzene, n-octadecyl 3-(4'-hydroxy-3', 5'-di-t-butylphenol)propionate, 4,4'-methylenebis(2,6-di-t-butylphenol), 4,4'-butylidene-bis(6-t-butyl-3-methylphenol), distearyl 3,5-di-t-butyl-4-hydroxybenzylphosphonate, 2-t-butyl-6-(3-t-butyl-5-methyl-2-hydroxybenzyl)-4-methylphenyl acrylate and N,N'-hexamethylenebis(3,5-di-t-butyl-4-hydroxy-hydrocinnamide). Also, the suitable antioxidant (a) may be a phosphoric antioxidant, such as triphenyl phosphite, tris-nonylphenyl phosphite, tris(2,4-di-t-butylphenyl) phosphite, tris(2-t-butyl-4-methylphenyl) phosphite, tris(2,4-di-t-amylphenyl) phosphite, tris(2-t-butylphenyl) phosphite, tris(2-t-phenylphenyl) phosphite, tris(2,4-(1,1-dimethylpropyl)phenyl) phosphite, tris(2-cyclohexylphenyl) phosphite and tris(2-t-butyl-4-phenylphenyl) phosphite. Further, the suitable antioxidant (a) may be a hindered amine antioxidant. These antioxidants may be used either individually or in combination. Of the above antioxidants, 1,6-hexanediol bis[3-(3,5-di-t-butyl-4hydroxyphenyl)propionate], pentaerythritol tetrakis[3(3,5-di-t-butyl-4-hydroxyphenyl)propionate], triethylene glycol bis[3-(3-t-butyl-5-methyl-4hydroxyphenyl)propionate] and N,N'-hexamethylenebis-(3,5-di-t-butyl-4-hydroxy-hydrocinnamide) are especially preferred.

The melamine-formaldehyde polycondensate (b) suitable for use in the present invention is a polycondensate produced by the conventional process in which melamine and formaldehyde are fed at a molar ratio of 1:1.0 to 1:10.0. The melamine-formaldehyde polycondensate (b) may be either water-soluble or water-insoluble, and its structure may be reticulated. Further, the melamine-formaldehyde polycondensate (b) may be one partially etherified with an alkanol having 1 to 4 carbon atoms. 50 mol % or more of the melamine may be replaced by another condensable compound, such as dicyandiamide and benzoguanamine. Generally, however, it is preferred that the produced melamine-formaldehyde polycondensate be insoluble in hot water, and that the average degree of polymerization thereof be at least 2. Although the average NH value of the melamine repeating units is not particularly limited, it is preferably at least 3.0.

In the present invention, the amount of the blended antioxidant (a) is generally in the range of 0.01 to 5.0 parts by weight, preferably 0.05 to 2.0 parts by weight, and the amount of the blended melamine-formaldehyde polycondensate (b) is also generally in the range of 0.01 to 5.0 parts by weight, preferably 0.05 to 2.0 parts by weight, per 100 parts by weight of the polyoxymethylene. When the amount of each of the above blended materials is too small, no desired effect can be obtained. On the other hand, when it is too large, the effect on the heat stability is in saturation, and rather the properties thereof are deteriorated unfavorably.

The metallic compound (c) suitable for use in the present invention is selected from among oxides and carbonates of magnesium and calcium. In particular, it is magnesium oxide, calcium oxide, and magnesium carbonate.

The above compound is blended in an amount of 0.001 to 10 parts by weight, preferably 0.001 to 10 parts by weight, further preferably 0.001 to 2 parts by weight, and still further preferably 0.003 to 0.5 part by weight per 100 parts by weight of the polyoxymethylene. When the amount is less than 0.001 part by weight, desired effects can hardly be obtained. On the other hand, when the amount is larger than 10 parts by weight, the effect of suppressing the generation of formic acid is in saturation, and rather the composition is likely to suffer discoloration unfavorably.

The metallic compound (c) and antioxidant (a) to be blended into the composition of the present invention may either be added to the monomer in the polymerization step, or may be added in the polymer stabilization step.

The polyoxymethylene composition of the present invention preferably further contains a fatty acid ester having 10 or more carbon atoms, especially an ester with a polyhydric alcohol, in order to minimize the deposit formed on molds during molding. The ester is, for example, selected from among glycerol monopalmitate, glycerol monostearate, glycerol monoisostearate, glycerol monobehenate and pentaerythritol tristearate. The above fatty acid ester having 10 or more carbon atoms is blended in an amount of 0.01 to 2.0 parts by weight, preferably 0.05 to 1.0 part by weight, per 100 parts by weight of the polyoxymethylene.

The method for measuring the amount of generated formic acid will be described below. The above composition is molded, and, if appropriate, the molded article is cut. After the surface area thereof is measured, an appropriate amount (about 30 to 60 $cm^2$ in terms of surface area) thereof is put in a hermetically sealed vessel (capacity of 100 ml) containing 1 ml of pure water in such a state that the molded article is not directly immersed in the water. The whole system is allowed to stand still at 60° C. for 168 hr, and the water is diluted to a volume of 100 ml. The formic acid concentration (μg) of the resultant solution is measured with an ion chromatograph (IC500 manufactured by Yokogawa-Hewlett-Packard, Ltd., with a column for organic acids and a 0.1 mM aqueous perchloric acid solution as a carrier) to determine the amount of the formic acid generated per unit surface area of the molded article ($μg/cm^2$).

A molded polyoxymethylene article preferred in the present invention is one wherein the amount of the formic acid generated is 1.0 μg or below per square centimeter of the surface area thereof, and particularly preferred is one wherein the amount of the formic acid generated is 1.0 μg or below per square centimeter of the surface area thereof and is 5.0 μg or below per gram of the resin. The above numerical limitation of the amount of the generated formic acid according to the present invention also applies to not only molded articles of polyoxymethylene compositions further containing conventional additives, such as customary stabilizers and mold releasing agents, but also molded articles of polyoxymethylene compositions containing inorganic fillers or other polymers as long as most of the surface of each of the molded articles is composed of the polyoxymethylene.

In accordance with the specific purpose of the use, the polyoxymethylene composition of the present invention may contain at least one member selected from among nitrogenous compounds other than the melamine-formaldehyde polycondensate (b) to be employed in the present invention and organic and inorganic metallic compounds other than the oxides and carbonates of magnesium and calcium (c) to be employed in the present invention, although the addition of the above member is not essential.

The polyoxymethylene composition of the present invention may be blended with various conventional additives, such as various colorants, slipperiness improvers, mold releasing agents, nucleating agents, antistatic agents, weathering (light) stabilizers, surfactants and polymers. Further, the polyoxymethylene composition of the present invention may be blended with at least one member selected from among the conventional organic, inorganic and metallic fillers in fibrous, platy and particulate forms, as long as the properties of the molded article which are desired in the present invention do not suffer from a substantial deterioration. Examples of the above inorganic fillers include glass and potassium titanate fibers, glass beads, talc, mica, muscovite and wollastonite, although the inorganic fillers suitable for use in the present invention are not limited to these. The production of the molded polyacetal resin article of the present invention may easily be carried out by the conventional procedure generally employed in the production of the conventional molded resin articles. For example, the molded article of the desired composition can be obtained by a process comprising mixing appropriate ingredients, kneading and extruding by means of a single-screw or twin-screw extruder to thereby prepare pellets, effecting mixing (dilution) of the pellets in given proportions and molding the resultant mixture. This process is not limiting, and, in the preparation of the composition to be formed into the above molded article, the implementation of the steps of pulverizing part or the whole of the polyacetal resin as the base resin and mixing the resultant powder with other ingredients prior to the extrusion is preferred from the viewpoint of improvement in the dispersion of the additives.

Although the resin composition of the present invention can be utilized in any of uses in which formic acid is believed to cause defects, it is suitably utilized in the fields (uses) of electrical or electronic equipment, especially audio or video equipment, at least some of the constituent parts of which include parts made from rubber or magnetic metal materials and molded polyoxymethylene articles. Particular examples of such molded articles will be described below.

Audio equipment such as a cassette tape recorder, video equipment such as a VTR, an 8-mm video and a video camera and office automation equipment such as a copier, a facsimile machine, a printer and a word processor may be mentioned as the above electrical or electronic equipment, at least some of the constituent parts of which include molded polyoxymethylene articles and rubber parts or many metal contact points. Further, the present invention applies to toys driven by means of a motor and springs, telephones, keyboards as computer peripherals and other equipment. Examples of such constituent parts include a chassis, a gear, a lever, a cam pulley and a bearing.

Further, a metal-thin-film-coated magnetic tape cassette, a magnetic disk cartridge, a magneto-optical disk cartridge and an optical disk cartridge may be mentioned as examples of a soft for optical and magnetic media having at least part thereof composed of molded polyoxymethylene articles. In particular, they are, for example, a musical metal tape cassette, a digital audio tape cassette, an 8-mm video tape cassette, a floppy disk cartridge and a minidisk cartridge. Particular examples of the parts include a main tape cassette frame, a reel, a hub, a guide, a roller, a stopper and a lid, and further include a main disk cartridge frame (casing), a shutter, a hub and a clamping plate.

Moreover, the molded polyoxymethylene article of the present invention can suitably be employed in metal-contacting parts such as a carrier plate of wind regulator, automobile parts such as fuel and electrical system parts, medical parts such as a syringe needle holder and household items such as a water purifier, a spray nozzle and a spray vessel.

It is apparent from the foregoing description and Examples that the molded polyacetal article prepared by molding the resin composition of the present invention, whose formic acid generation is 1.0 µg or below, has no significant effect on the rubber blooming. The present invention serves to suppress the generation of formic acid from the molded article to 1.0 µg or below, so that it radically resolves the blooming problem of, for example, rubber parts. Thus, the molded article of the present invention can be utilized in a large variety of fields as mentioned hereinbefore.

EXAMPLES

The present invention will now be described with reference to the following Examples, which should not be construed as limiting the invention.

The following evaluation methods were employed in the Examples below.

(1) Amount of formic acid generated from molded article

The amount of generated formic acid was determined as follows. 10 g of the molded polyoxymethylene article so cut as to have a total surface area of about 10 cm$^2$ was put in a hermetically sealed vessel (capacity of 100 ml) containing 1 ml of pure water in such a state that the molded article was not directly immersed in the water. The whole system was allowed to stand still at 60° C. /90%RH for 168 hr, and the water in the vessel was diluted to a volume of 100 ml. The formic acid concentration of the resultant solution was measured with an ion chromatograph (IC500 manufactured by Yokogawa-Hewlett-Packard, Ltd., with column for organic acids and a 0.1 mM aqueous perchloric acid solution as a carrier). The amount of the formic acid generated per unit surface area of the molded article was calculated from the measurement value obtained by the ion chromatograph.

(2) Blooming of rubber

Use was made of an audio/video reproducing mechanism unit comprising a chassis equipped with a molded polyacetal resin article and, assembled thereinto, a rubber part, which unit was packed in a polyethylene bag. A rubber blooming test was conducted in a high-temperature and high-humidity atmosphere in the following manner, thereby determining the relationship between the amount of the formic acid generated from the molded chassis and the amount of the bloom lying on the surface of the rubber part (ranked into 10 levels by microscopic observation of the rubber surface). The relationship is as shown in the Table.

A roller obtained by molding chloroprene rubber into a cylindrical shape was used as the rubber part, and assembled into a chassis for use in the audio/ video reproducing mechanism unit produced by molding a polyacetal resin. The resultant chassis was packed in a polyethylene bag, and was allowed to stand still in a 60° C. /90%RH atmosphere for one week. The rubber surface was observed through a microscope to find any bloom on the surface and to visually rank the amount of the bloom into 10 levels (level 1: none, and level 10: extremely large amount). This test was carried out three times. The Table shows the average thereof. (3) Moldability (amount of deposit formed on molds)

A sampled polyacetal resin composition was molded continuously (24 hr) into a molded article of a specified configuration by the use of an injection machine under the following conditions, and the amount of the deposit formed on the mold was evaluated. More specifically, the mold stain due to continuous molding was visually inspected to rank it into the following five grades.

(Molding conditions)
Injection machine: Toshiba IS30EPN (manufactured by Toshiba Machine Co., Ltd.)
Cylinder temperature: 210° C.

-continued

| | |
|---|---|
| Injection pressure: | 750 kg/cm² |
| Injection time: | 4 sec |
| Cooling time: | 3 sec |
| Mold temperature: | 30° C. |

| A | B | C | D | E |
|---|---|---|---|---|
| extremely small amount | | | | large amount (deposited throughout the surface) |

Examples 1 to 11

Polyoxymethylene copolymer (Duracon produced by Polyplastics Co., ltd.) was blended with an antioxidant, a melamine-formaldehyde polycondensate, a member selected from among oxides and carbonates of magnesium and calcium, and a fatty acid ester each specified in Table 1 in the proportions (per 100 parts by weight of the polyoxymethylene) specified in Table 1, and extruded by an extruder to obtain a pelletized composition. The above evaluations were performed, and the results are shown in Table 1.

Comparative Examples 1 to 8

For comparison, the pelletized compositions were prepared in the same manner as in Example 1, except that no metal oxide or carbonate was added or a metal oxide other than that to be employed in the present invention was added as specified in Table 1. The above evaluations were performed, and the results are shown in Table 1.

The employed antioxidants, melamine-formaldehyde polycondensates and metal oxides and carbonates are as specified below.

1. Antioxidant
   (a) 2,2'-methylenebis(4-methyl-6-t-butylphenol)
   (b) pentaerythritol tetrakis[3-(3,5-di-t-butyl-4hydroxyphenyl)propionate]

2. Melamine-formaldehyde polycondensate (b-1) melamine-formaldehyde polycondensate obtained by conducting polycondensation of formaldehyde and melamine fed at a molar ratio of 1.5:1 and then purification comprising immersion in 60° C. water, 30-min filtration, acetone washing and room temperature drying. (b-2) melamine-formaldehyde polycondensate obtained by conducting polycondensation of formaldehyde and melamine fed at a molar ratio of 3.0:1 and then the same purification as in item (b-1) above.

3. Metal oxide and carbonate
   (c-1) magnesium oxide
   (c-2) calcium oxide
   (c-3) magnesium carbonate
   (c'-1) barium oxide
   (c'-2) zinc oxide 4 Fatty acid ester
   (d-1) glycerol monostearate
   (d-2) glycerol monoisostearate 5. Other nitrogenous compound
   (e-1) melamine
   (e-2) dicyandiamide

TABLE 1

| | Invention Ex. | | | | | | | | | | | Comp. Ex. | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 | 5 | 6 | 7 | 8 |
| Antioxidant (pts. wt.) | a-1 0.5 | a-1 0.5 | a-1 0.5 | a-1 0.5 | a-1 0.5 | a-1 0.5 | a-1 0.5 | a-1 0.5 | a-1 0.5 | a-2 0.5 | a-1 0.5 | a-1 0.5 | a-1 0.5 | a-1 0.5 | a-1 0.5 | a-1 0.5 | a-2 0.5 | a-1 0.5 | a-1 0.5 |
| Melamine-formaldehyde polycondensate (pts. wt.) | b-1 0.3 | b-1 0.3 | b-1 0.3 | b-1 0.3 | b-1 0.3 | b-1 0.3 | b-1 0.3 | b-1 0.3 | b-1 0.5 | b-1 0.3 | b-2 0.3 | b-1 0.3 | b-1 0.3 | b-1 0.3 | | | b-1 0.3 | b-2 0.3 | b-2 0.3 |
| Metal compound (pts. wt.) | c-1 0.01 | c-1 0.10 | c-1 0.3 | c-2 0.10 | c-3 0.10 | c-1 0.10 | c-1 0.10 | c-1 0.10 | c-1 0.10 | c-1 0.10 | c-1 0.10 | | c'-1 0.10 | c'-2 0.10 | c-1 0.10 | c-1 0.10 | | | c'-1 0.10 |
| Fatty acid ester (pts. wt.) | | | | | | d-1 0.5 | d-2 0.5 | | | | | | | | | | | | |
| Other nitrogenous compound (pts. wt.) | | | | | | | | | | | | | | | e-1 0.3 | e-2 0.3 | | | |
| Amount of generated formic acid (μg/cm²) | 0.85 | 0.47 | 0.23 | 0.64 | 0.67 | 0.44 | 0.40 | 0.43 | 0.42 | 0.48 | 0.50 | 2.24 | 1.72 | 2.16 | 0.45 | 0.50 | 2.23 | 2.37 | 1.81 |
| Rubber blooming ranking | 2.7 | 1.3 | 1.0 | 1.7 | 1.7 | 1.3 | 1.0 | 1.3 | 1.3 | 1.3 | 1.3 | 8.3 | 7.7 | 8.3 | 1.3 | 1.3 | 8.3 | 8.7 | 8.0 |
| Deposit formed on mold | B | B | B | B | B | A | A | B | B | B | B | B | B | B | D | E | B | B | B |

We claim:

1. A polyoxymethylene composition which comprises a blend of 100 parts by weight of a polyoxymethylene with:
   (a) 0.01 to 5.0 parts by weight of an antioxidant,
   (b) 0.01 to 5.0 parts by weight of a melamine-formaldehyde polycondensate, and
   (c) 0.001 to 10 parts by weight of at least one metallic compound selected from the group consisting of magnesium oxide, magnesium carbonate and calcium oxide.

2. A polyoxymethylene composition as set forth in claim 1, wherein the melamine-formaldehyde polycondensate (b) is the polycondensation reaction product of melamine and formaldehyde at a molar ration of from 1:1.0 to 1:10.0.

3. A polyoxymethylene composition as set forth in claim 1, which further contains a fatty acid ester having 10 or more carbon atoms in an amount of 0.01 to 2.0 parts by weight per 100 parts by weight of the polyoxymethylene.

4. A molded polyoxymethylene article formed of the composition as set forth in claim 1, wherein the amount of formic acid generated from the molded article is 1.0 μg or below per square centimeter of surface area of the molded article.

5. A molded polyoxymethylene article as set forth in claim 4, in the form of a part for electrical or electronic equipment.

6. Electrical or electronic equipment containing a part formed of the molded polyoxymethylene article as set forth in claim 4, and another part made from a rubber material.

* * * * *